Feb. 28, 1950
J. T. GRIFFITH, JR
2,499,140
HOLDER FOR SPECTACLES
Filed Nov. 15, 1946
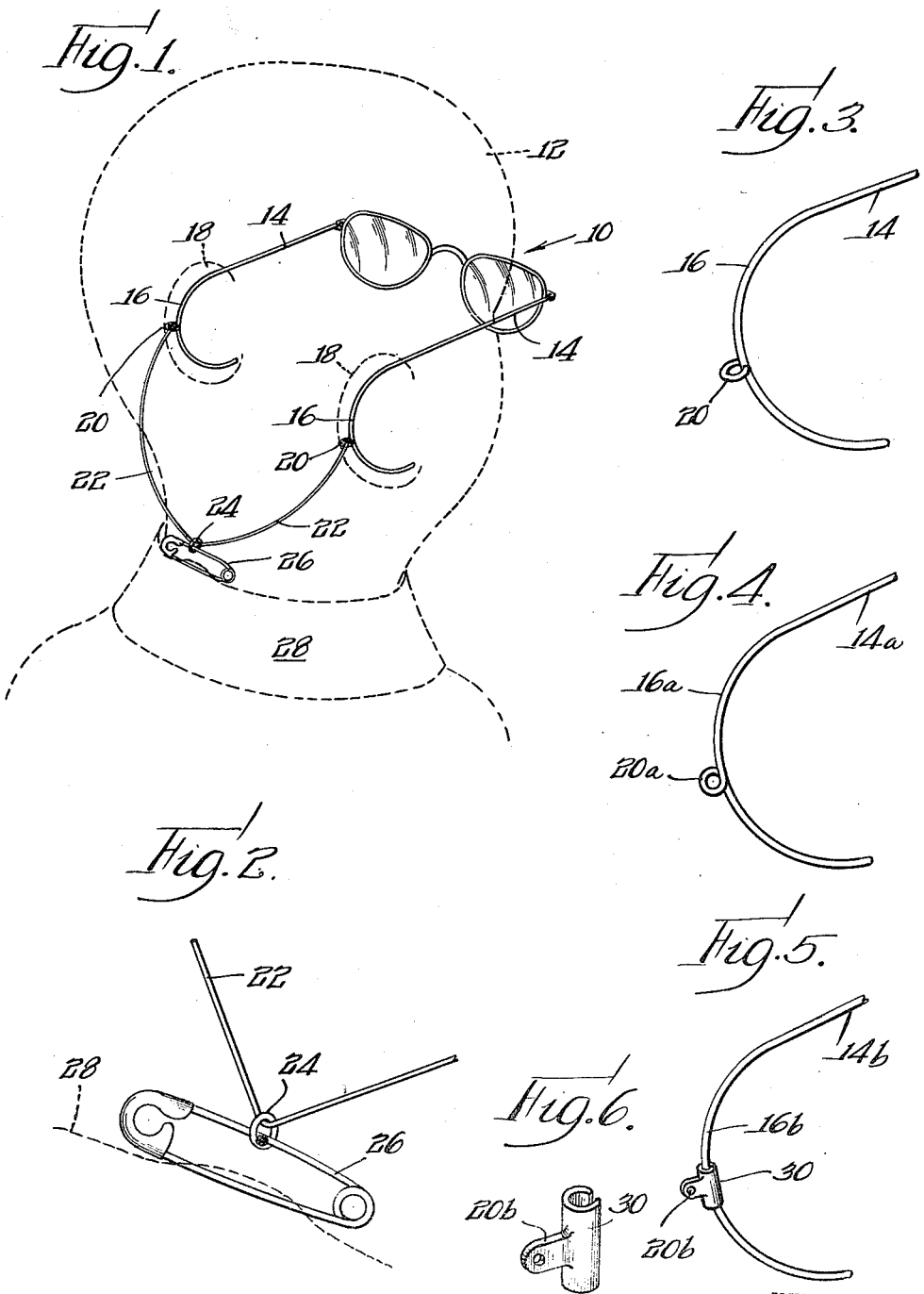
INVENTOR.
Joshua Todd Griffith Jr,
BY
Moore, Olson & Trexler
attys Patented Feb. 28, 1950

2,499,140

UNITED STATES PATENT OFFICE 2,499,140

HOLDER FOR SPECTACLES

Joshua Todd Griffith, Jr., Highland Park, Ill.

Application November 15, 1946, Serial No. 710,181

4 Claims. (Cl. 88—51)

This invention relates to spectacles and has for its object the provision of improved means for attaching spectacles to the clothing of the wearer.

Certain persons, such as small children who are required to wear glasses, are bothered by the presence of spectacles and often attempt to remove and abandon them. Prior spectacle holders have not proved satisfactory in restraining such a tendency because they involve further causes of irritation that aggravate the sensation of wearing glasses, and frequently they are not effective against a determined effort to remove the spectacles.

The present invention aims to provide an improved holder for spectacles which imposes substantially no restriction upon the wearer and is extremely effective in preventing the spectacles from falling or being placed where they may become damaged or lost.

In carrying out the principles of the invention, I contemplate attaching a flexible member to the temple pieces of a pair of spectacles and passing the flexible member through a fastening device that is attached to the clothing of the wearer, the flexible member having a loose sliding fit in the portion of the fastening device which receives it so that it does not hinder movement of the wearer's head. My novel holder is so designed that the wearer is entirely unconscious of its presence except when an attempt is made to remove the spectacles from their customary position of use.

The above and various other objects, advantages and features of the invention will be apparent from the following specification when taken in connection with the accompanying drawing wherein certain preferred embodiments are set forth for purposes of illustration.

In the drawing, wherein like reference numerals refer to like parts throughout:

Fig. 1 is a perspective view of a pair of spectacles together with a holder for the spectacles constructed in accordance with and embodying the principles of the invention, the associated portions of the wearer's body being indicated in phantom;

Fig. 2 is a perspective view of the fastening device and a portion of the flexible member;

Fig. 3 is a detail view of a portion of a temple piece showing an eyelet to which the flexible member may be attached;

Fig. 4, which is a view similar to Fig. 3, shows a modified form of eyelet;

Fig. 5, which likewise is a view similar to Fig. 3, shows still another modified form of eyelet; and Fig. 6 is a perspective enlarged view of the eyelet illustrated in Fig. 5.

Referring to Figs. 1, 2 and 3, which illustrate one embodiment of my invention, a pair of spectacles 10 of conventional design is shown in its usual position on the head 12 of a wearer. The temple pieces 14 of the spectacles 10 have curved portions 16 adapted to fit behind the ears 18 of the wearer. Eyelets 20 are provided on the curved portions 16, these eyelets being soldered or otherwise bonded to the temple pieces 14 in this embodiment of the invention. A cord, chain or other flexible member 22 is attached at its ends to the eyelets 20 and passes through an eyelet or ring 24 on a fastening device 26, such as a safety pin, which is adapted for attachment to a portion of the clothing such as the collar 28 of the wearer. The eyelet 24 may be loosely carried by the fastening device 26 or secured thereto as desired.

As a feature of the present invention, the opening in the eyelet 24 through which the flexible member 22 passes is sufficiently large in comparison with the thickness of the member 22 to permit free sliding movement of the member 22 through the eyelet 24. Thus, the holder does not hamper the normal head movements of the wearer. Likewise, the member 22 is loose enough so that it does not bind the wearer's head, and being light weight, is not noticed by the wearer when in use.

The holder comprising the fastening device 26, flexible member 22 and eyelets 20 on the temple pieces 14 effectively restrains intentional or unintentional removal of the spectacles 10, thereby preventing loss, misplacement and damaging of the spectacles. The fastening device 26 is a positive safeguard against removal of the spectacles completely from the body of the wearer. It will be understood, of course, that the fastening device 26 may be mounted on any other portion of the wearer's clothing as well as on the rear of the collar 28, preferably being located where it is inaccessible to the wearer.

In Fig. 4 there is shown a modification wherein the eyelet 20a on each temple piece 14a is formed by looping the curved portion 16a of the temple piece.

In some instances it may be impracticable to form the eyelet in the manner illustrated in Fig. 3 or Fig. 4. Therefore, I have illustrated in Figs. 5 and 6 an eyelet 20b having a clamp portion 30 adapted to be press-fitted on the curved portion 16b of a temple piece 14b. Such an arrangement would be particularly useful in the case of plastic temple pieces.

While the structural details disclosed herein are representative of certain embodiments of the invention, it will be apparent that the invention is capable of other modifications and changes without departing from the spirit and scope of the appended claims.

The invention is hereby claimed as follows:

1. In combination with spectacle temple pieces having curved portions adapted to fit around the ears of the wearer, a coupling member associated with each of the curved portions of the temple pieces, a fastening device adapted for attachment to the clothing of the wearer, eyelet means on said fastening device, and an elongated flexible member attached to and extending between said temple piece coupling members and adapted to extend through the eyelet means on said fastening device, said member having a loose longitudinal sliding fit in said eyelet means.

2. In combination with spectacle temple pieces adapted to fit around the ears of the wearer, a coupling member associated with each of the curved portions of said temple pieces, a fastening device adapted for attachment to clothing of the wearer, eyelet means on said fastening device, and an elongated flexible member attached to and extending between said temple piece coupling members and passing freely through the eyelet means on said fastening device, the length of said flexible member being such as to enable it to hang loosely from said coupling members when in use.

3. In combination with spectacles having temple pieces with curved portions adapted to fit around the ears of the wearer, said curved portions having loops formed therein to afford eyelets on the temple pieces, a fastening device adapted for attachment to the clothing of the wearer, an eyelet on said fastening device, and a flexible member attached to and extending between said temple piece eyelets and passing freely through the eyelet on said fastening device.

4. In a device for spectacles, a pair of coupling supporting members respectively adapted for attachment to spectacle temple pieces, a coupling carried by each member, an elongated flexible member attached to and extending between said couplings, and a fastening device adapted for attachment to the clothing of the wearer, said fastening device having an opening for longitudinally and slidably accommodating said flexible member.

JOSHUA TODD GRIFFITH, JR.

REFERENCES CITED

The following references are of record in the file of this patent:

UNITED STATES PATENTS

| Number | Name | Date |
|---|---|---|
| 582,886 | Start | May 18, 1897 |
| 2,023,523 | Grimball | Dec. 10, 1935 |
| 2,249,572 | Lieber | July 15, 1941 |

FOREIGN PATENTS

| Number | Country | Date |
|---|---|---|
| 518,520 | Great Britain | Feb. 29, 1940 |